Patented Apr. 30, 1940

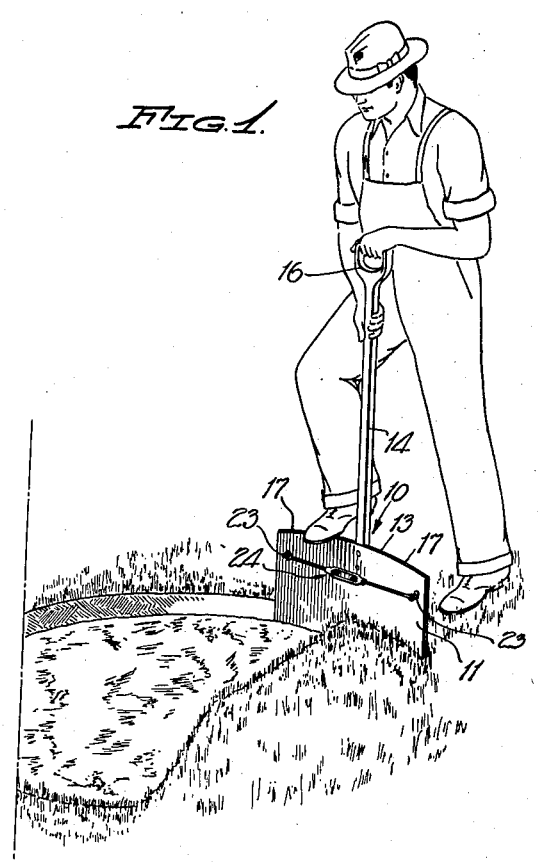

2,199,072

UNITED STATES PATENT OFFICE 2,199,072

FLOWER BED EDGING IMPLEMENT

Perry M. Garabrant, Scotch Plains, N. J.

Application March 20, 1939, Serial No. 262,889

8 Claims. (Cl. 294—49)

This invention relates to improvements in garden implements, and has particular reference to a flower bed edger.

The principal object of the invention resides in a garden implement by the use of which a circular or other curved shaped flower bed may be accurately laid out without the aid of guide markers.

Another feature of the invention is to provide a garden tool which is adapted for use in edging round, oval, or other curved edged flower and shrubbery beds, to assure an even curved edge which cannot be obtained by the ordinary garden spade or straight blade edges generally used for edging purposes.

Another feature of the invention is the provision of a flower bed edger which includes a flexible metal blade whose inherent characteristic is normally flat, but which carries a novel means for effecting a flexing of the blade to different curvatures and for maintaining the flexed blade in a set curved position for use.

Another feature of the invention is to provide an edging implement for trimming the curved edges of flower beds, shrubbery beds, lawns, driveways, and the like, which is simple and inexpensive of construction, light in weight and readily adjustable to conform to the curvature of the edge to be trimmed.

Other features of the invention will be apparent as the following specification is read in conjunction with the accompanying drawing, in which:

Figure 1 is a perspective view showing my edging implement in use for laying out a circular flower bed.

Figure 2 is an enlarged perspective view of the edging implement per se, the blade being adjusted to a predetermined curvature.

Figure 3 is a horizontal sectional view on the line 3—3 of Figure 2 and showing in dotted lines, the normal flat straight position of the edging blade.

Figure 4 is a vertical sectional view on the line 4—4 of Figure 2.

Figure 5 is an enlarged detail horizontal sectional view through the flexible connection between one end of the blade and the adjacent end of the turnbuckle.

Referring to the drawing by reference characters, the numeral 10 designates my flower bed edging implement in its entirety and which includes a normally flat relatively thin flexible blade 11 of rectangular configuration. The blade 11 is preferably constructed of spring steel of about one-sixteenth thickness, although I do not wish to limit myself to any particular thickness of metal for other thicknesses may be adaptable so long as the blade may be flexed into arcuate shape along its length. The blade 11 has a straight bottom cutting edge 12 and a straight top edge 13. Fixed to the blade 11 midway between its ends is one end of a handle 14, the said handle being secured to the blade by bolts 15. The upper end of the handle 14 terminates in a hand grip 16. The top edge 13 at opposite sides of the handle 14 constitutes footrest portions 17—17 similar to those provided on a garden spade.

The blade 11 adjacent opposite ends thereof is provided with a pair of spaced openings 18—18 through each of which the threaded shank 19 of a bolt 20 extends. The bolt 20 has a flat head or flange 21 intermediate its ends and which flange fits against the front side of the blade 11. A cap nut 22 is threaded to the shank 19 and cooperates with the flat head or flange 21 to secure the bolt rigidly to the blade 11. The forwardly extending portion of the bolt 20 loosely carries a split ring 23 and the rings 23 adjacent opposite ends of the blade form part of a flexible connection for the opposite ends of a turnbuckle device 24. The turnbuckle device 24 includes a pair of rods 25—25 having eyes 26 at the outer ends thereof and which eyes engage the respective rings 23. The inner ends of the rods 25—25 are reversely screw threaded as at 27, that is, the threads on the end of one rod 25 is a right hand thread and those on the inner end of the other rod are left hand threads. The threaded ends of the rods 25—25 are connected by a turnbuckle 28, the opposite ends of the turnbuckle being provided with reversely threaded bores 29 which respectively receive the corresponding threaded ends 27 of the rods 25. From the construction just described, it will be seen that by rotating the turnbuckle 28, the rods 25—25 may be drawn toward each other to increase the degree of flexing of the blade 11 and by turning the turnbuckle in an opposite direction, the degree of curvature of the blade may be decreased.

The flexible connections which secure opposite ends of the turnbuckle device 24 to the blade 11 permits of a relatively wide range of flexing of the blade and permits the turnbuckle device to lie substantially parallel to the front side of the blade when the blade is in a normal flat unflexed position.

In Figure 1 of the drawing I have illustrated the use of the implement 10 for laying out a circular flower bed. To lay out a circular flower bed, the turnbuckle 28 is turned to effect a flexing of the blade 11 to a curvature which forms a segment of a circle of a predetermined diameter. After the blade is set to the proper curvature, the operator presses the bottom edge 12 downwardly into the earth which upon withdrawal of the blade leaves an arcuate mark. By progressively shifting the blade and pressing down thereon to produce further arcuate marks, a complete circle may be marked out, after which the operator or gardener may take the usual spade and dig the bed or plot within the boundary of the marks made by the arcuately flexed blade 11.

When the implement 10 is to be used for trimming up curved edges of flower or shrubbery beds, the blade 11 is flexed to the proper curvature by the manipulation of the turnbuckle 28 and the operator trims the curved edge of the flower bed to the curvature of the set blade. In all instances, the curvature of the flexed blade 11 predetermines the curvature of the edge trimmed thereby.

While I have shown and described what I consider to be the most practical embodiment of my invention, I wish it to be understood that such changes in construction and arrangement of parts may be resorted to as come within the scope of the appended claims.

Having thus described the invention, what I claim as new and desire to secure by Letters Patent of the United States, is:

1. An implement of the class described comprising a handle, a normally straight flexible blade fixedly secured to one end of said handle, and means carried by said blade for effecting an arcuate flexing of said blade and for maintaining the same in such arcuate flexed position.

2. An implement of the class described comprising a handle, a normally straight flexible blade secured to one end of said handle, and adjustable means connected to said blade adjacent opposite ends thereof for effecting and maintaining an arcuate flex in said blade.

3. An implement of the class described comprising a normally flat flexible blade having a lower straight working edge, a handle having one of its ends fixedly secured to said blade midway between its ends and extending above the top edge thereof, and means carried by said blade for flexing said blade from one end thereof to the other and for maintaining the same in an adjusted flexed position.

4. An edging implement for curved flower beds comprising a normally flat elongated flexible blade, a handle having one of its ends fixedly secured to said blade midway between the ends thereof, and a turnbuckle device having its ends connected adjacent the opposite ends of said blade on the inner side thereof.

5. An edging implement comprising a relatively thin flexible metal blade whose inherent characteristic is flat, a handle having one of its ends fixedly attached to said blade, and adjustable means carried by said blade for flexing and securing said blade in various arcuate positions.

6. A flower bed edger comprising a flexible blade, a handle secured to said blade, and a turnbuckle device for arcuately flexing said blade including a pair of spaced rods having reverse threads on the inner ends thereof, means connecting the outer ends of said rods to the end portions of said blade, and a turnbuckle threadedly connected to the reversely threaded inner ends of said rods.

7. A flower bed edger comprising a normally flat flexible metal blade, a handle secured to said blade, and means carried by said blade for effecting a flexing of said blade and for securing the blade in flexed condition including a pair of alined rods having their inner ends reversely threaded and disposed in spaced relation, flexible connections between the outer ends of said rods and end portions of said blade, and a turnbuckle member threaded to the reversely threaded ends of said rods.

8. A garden implement comprising a relatively thin normally flat rectangular shaped blade elongated in a horizontal direction, a handle secured to said blade midway between its ends and extending to said blade midway between its ends and extending upwardly above the top edge thereof, the top edge of said blade at opposite sides of said handle constituting footrests, and means extending lengthwise of said blade on one side thereof and attached thereto adjacent the ends of said blade for effecting and maintaining said blade at various flexed arcuate positions.

PERRY M. GARABRANT.